United States Patent
Kachelhoffer

(12) 
(10) Patent No.: US 12,485,727 B2
(45) Date of Patent: Dec. 2, 2025

(54) ELECTRIC HEATING DEVICE

(71) Applicant: Eberspächer catem GmbH & Co. KG, Herxheim (DE)

(72) Inventor: Patrick Kachelhoffer, Seebach (FR)

(73) Assignee: Eberspächer catem GmbH & Co. KG, Herxheim (DE)

( * ) Notice: Subject to any disclaimer, the term of this patent is extended or adjusted under 35 U.S.C. 154(b) by 933 days.

(21) Appl. No.: 17/694,831

(22) Filed: Mar. 15, 2022

(65) Prior Publication Data

US 2022/0297506 A1 Sep. 22, 2022

(30) Foreign Application Priority Data

Mar. 16, 2021 (DE) ...................... 10 2021 106 299.3

(51) Int. Cl.
*B60H 1/22* (2006.01)
*H05B 1/02* (2006.01)

(52) U.S. Cl.
CPC ......... *B60H 1/2215* (2013.01); *B60H 1/2221* (2013.01); *H05B 1/0244* (2013.01); *H05B 2203/016* (2013.01); *H05B 2203/02* (2013.01); *H05B 2203/021* (2013.01)

(58) Field of Classification Search
CPC .. B60H 1/2215; B60H 1/2221; H05B 1/0244; H05B 2203/016; H05B 2203/02; H05B 2203/021
See application file for complete search history.

(56) References Cited

U.S. PATENT DOCUMENTS

| | | |
|---|---|---|
| 6,455,822 B1 | 9/2002 | Chang |
| 2006/0289475 A1 | 12/2006 | Tung et al. |
| 2012/0085742 A1* | 4/2012 | Niederer ............... F24H 15/335 219/385 |
| 2014/0348497 A1* | 11/2014 | Giffels .................... F24H 1/121 392/480 |
| 2018/0031271 A1* | 2/2018 | Huang .................. F24H 9/0021 |
| 2021/0033303 A1* | 2/2021 | Kachelhoffer ........ F24H 3/0476 |

FOREIGN PATENT DOCUMENTS

| | | |
|---|---|---|
| DE | 2804804 A1 | 8/1979 |
| DE | 102006018151 A1 | 10/2007 |
| DE | 102011054752 A1 | 4/2013 |
| DE | 102012101564 A1 | 8/2013 |

(Continued)

*Primary Examiner* — Elizabeth M Kerr
*Assistant Examiner* — Keith Brian Assante
(74) *Attorney, Agent, or Firm* — Boyle Fredrickson, S.C.

(57) ABSTRACT

An electric heating device includes a housing which forms a heating element receptacle and at least one fluid channel. A PTC heating assembly with a press-fit profile is inserted into the heating element receptacle. The press-fit profile forms a PTC receptacle in which at least one PTC element, strip conductors abutting thereon in an electrically conductive manner and, if appropriate, an insulation supporting the strip conductors in an insulated manner against the PTC receptacle, are provided. The housing is formed from an extruded profile and is held under a pretension in the heating element receptacle by deformation projections located between the housing and the press-fit profile. The deformation projections are formed by the housing and/or the press-fit profile.

16 Claims, 5 Drawing Sheets

(56) References Cited

FOREIGN PATENT DOCUMENTS

| | | |
|---|---|---|
| DE | 10 2018 221654 A1 | 6/2020 |
| DE | 10 2019 211567 A1 | 2/2021 |
| DE | 102019211565 A1 | 2/2021 |
| DE | 102019211569 A1 | 2/2021 |
| DE | 102020201571 A1 | 8/2021 |
| DE | 102020113402 A1 | 11/2021 |
| EP | 0899985 A1 | 3/1999 |
| EP | 2 337 425 A1 | 6/2011 |
| EP | 2 637 474 A1 | 9/2013 |

* cited by examiner

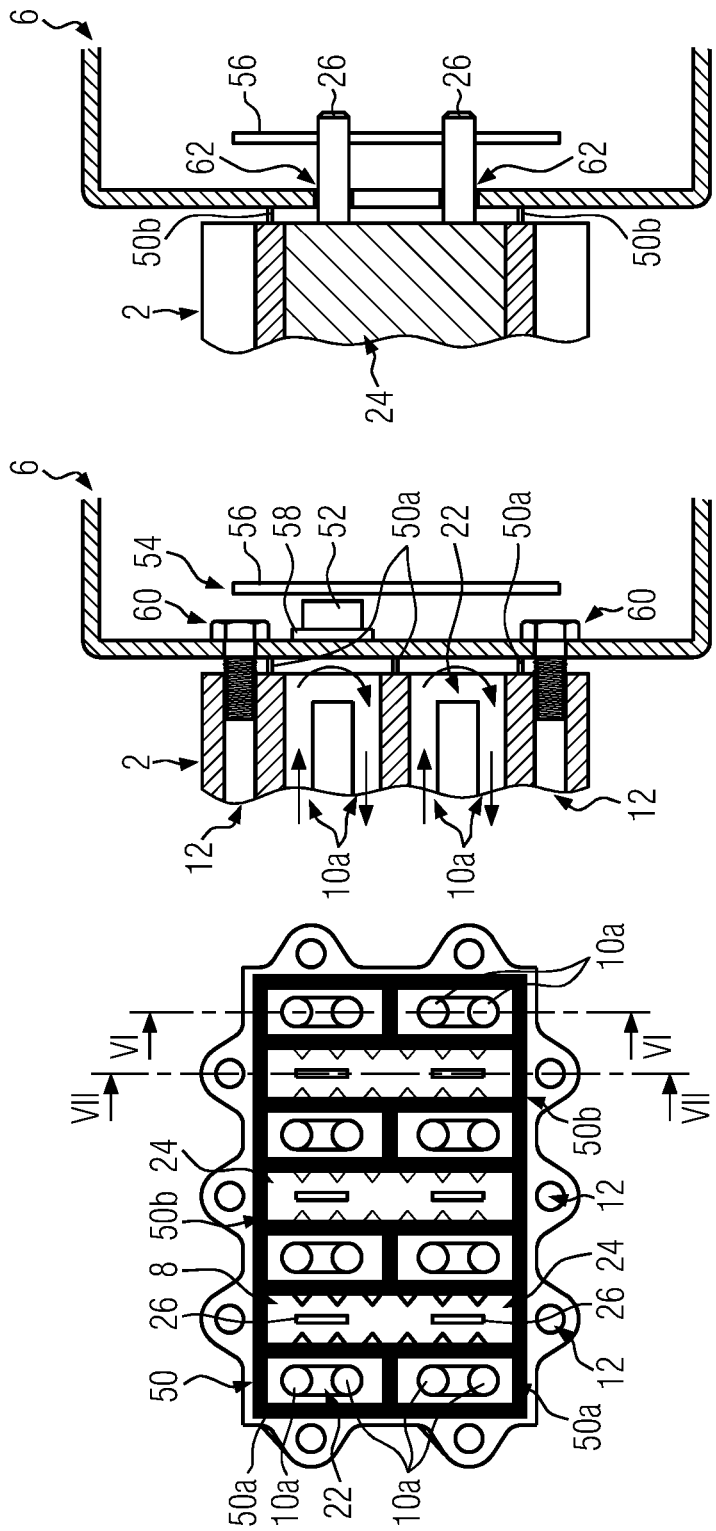

ELECTRIC HEATING DEVICE

BACKGROUND OF THE INVENTION

1. Field of the Invention

The present invention relates to an electric heating device having a housing forming a heating element receptacle, which typically holds at least one PTC element under preload, and at least one fluid channel. The PTC heating assembly has a press-fit profile adapted for insertion into the heating element receptacle and forming a PTC receptacle. In this PTC receptacle, at least one PTC element, strip conductors electrically conductively abutting thereon, and optionally an insulation are provided to insulatively support the strip conductors against the heating element receptacle. This optionally provided insulation can be provided if—which is probably more the rule—the press-fit profile itself is formed from a metal and thus an electrically conductive material.

2. Background of the Invention

According to the present invention, the housing components are to be potential-free, i.e., not used for conducting the power current.

An electric heating device having the features of the preamble of claim 1 is known, for example, from EP 2 637 474 A1 or EP 2 337 425 A1. In this prior art, the housing is provided with a U-shaped receiving pocket which forms the heating element receptacle and in which a profile is provided which is pressed into the receiving pocket and receives at least one PTC element therein. In this context, the solution described in EP 2 337 425 A1 discloses a strip conductor abutting a main side surface of the PTC element as a piece of sheet metal with contact projections bent out of the plane of the piece of sheet metal. These only serve to improve electrical contacting, however not to provide pretensioning. In the prior art, pretensioning is rather carried out with a wedge element which is forced into the receiving pocket in order to apply the heat-generating layers against the inner surfaces of the heating element receptacle in the best possible heat-conducting manner, if necessary with interposition of the insulation, and thus on the one hand to ensure good heat dissipation, but on the other hand also to make reliable electrical contact between the strip conductors and the PTC element.

A PTC element is a semiconducting ceramic component with self-regulating properties. With increasing heating, the electrical resistance increases. Thus, the ability of the PTC element to absorb electrical power and convert it into heat decreases. For good efficiency, therefore, good thermal contacting of the PTC element is essential to dissipate the heat generated within it.

In the past, there has been no lack of proposals to meet the various requirements of an electric heating device. The electric heating device according to the present invention is used in particular in a motor vehicle. Here, special conditions apply which have to be met by the electric heating device. On the one hand, the electric heating device must be configured to be as weight-saving as possible. On the other hand, the conditions in the motor vehicle must be taken into account. Thus, the electric heating device must be able to permanently withstand the vibrations in a motor vehicle and remain operational for years. Finally, scalability of the structural configuration is also required nowadays so that the electric heating device can be easily adapted to different models and equipment variants. The electric heating device according to the present invention may be provided as a sole heater, for example, in an electrically powered vehicle. This electric heating device heats at least the interior, and optionally also components of the drive of the electrically operated vehicle. However, the electric heating device can also be provided as an auxiliary heater in a vehicle with an internal combustion engine, the cooling water of which is discharged via a heat exchanger and used for air conditioning the vehicle interior. It is understood that the electric heating device is not operated permanently. Thus, the electric heating device is also exposed to thermal fluctuations, which lead to different expansion and tension states within the electric heating device. These are accompanied by dimensional changes in the structural configuration of the electric heating device, which in any case in the electric heating device according to the invention must not lead to a loss of good electrical and thermal contacting of the PTC element during the service life of the electric heating device.

SUMMARY

The present invention aims to provide an electric heating device of the type introductorily mentioned, which meets the above requirements in an improved manner. The electric heating device according to the invention is intended to provide good heat extraction from the PTC element with reduced manufacturing and assembly costs.

In order to solve this problem, the present invention proposes an electric heating device including at least one PTC element and electrically conductive strip conductors, usually in the form of sheet metal strips. The heating cell thus formed, optionally surrounded by insulation, is provided in a press-fit profile. Deformation projections are formed between the housing and the press-fit profile by the housing and/or the press-fit profile, wherein the projections hold the press-fit profile under a pretension in the heating element receptacle.

The press-fit profile is usually a cylindrical unitary component. The press-fit profile can be formed from a ceramic. In this case, the insulation can be dispensed with. The press-fit profile, however, is usually formed from a metal. The press-fit profile may be manufactured as an extruded profile and cut to length.

In the same way, the housing of the electric heating device according to the invention may be formed as an extruded profile and cut to length. It is possible to combine several such housings in the electric heating device, allowing easy adaptation to the desired heating power and thus to different vehicle types and equipment.

The pretension provided by the deformation projections may be such that a retention of the PTC element and the strip conductors, if applicable, of the insulation results within the PTC receptacle, in which these layers are applied against each other in a well heat-conducting manner at least with respect to the main side surfaces of the PTC element, are regularly applied against each other under pretension. The main side surfaces of the PTC element are the largest surfaces of the PTC element. This is usually cuboidal in shape. The main side surfaces are parallel to each other. The other surfaces usually form a circumferential edge that connects the two main side surfaces.

Accordingly, the electric heating device according to the invention may have two extruded profiles. One extruded profile forms the housing. The other extruded profile forms the press-fit profile. The deformation projections are provided between the two extruded profiles. These deformation projections also usually extend in the extension direction of the profiles. When the press-fit profile is inserted into the heating element receptacle of the housing, the deformation projections are deformed. The deformation can be a plastic and/or elastic deformation. The deformation results in a solid heat-conducting and electrical contact between the PTC element, the strip conductors abutting against the main side surfaces and the opposing inner surface of the PTC receptacle, if necessary with interposition of the insulation.

Depending on the length of the extruded profile, several PTC elements can be provided one behind the other. The length of the extruded profile can be cut to any desired length. In this way, the electric heating device can also be adapted to the desired heating power by changing the length of the housing. The PTC elements are provided evenly one behind the other in the longitudinal direction of the press-fit profile. As is generally known from the prior art, the PTC elements can be received in a positioning frame which extends essentially between the two strip conductors and forms respective receptacles for the PTC elements offset one behind the other in the longitudinal direction of the press-fit profile.

For uniform extraction of the heat generated by the at least one PTC element, the housing may form several fluid channels extending parallel to each other. The at least one heating element receptacle is provided between at least two fluid channels. It may be desirable to provide at least two, and even four or more, fluid channels on both sides of the heating element receptacle. An even number of fluid channels is beneficial, since fluid is usually introduced at one end face of the housing and merely deflected on the opposite side, wherein flow guidance is easier if the fluid is transferred beyond a heating element receptacle and transversely to its extension on the side where the fluid is introduced. Thus, a cover to the housing can be formed relatively easy on the opposite side.

Opposite to such a cover which usually deflects the flow from one fluid channel into the other fluid channel of the housing, there may be provided a connection housing which connects one of the fluid channels to an inlet opening for the fluid to be heated and the other of the fluid channels to an outlet opening for the fluid to be heated. It is understood that the housing may form a plurality of fluid channels, each of which is connected in series by deflecting the flow at the end faces of the extruded profile and is connected to the inlet and outlet openings only at its beginning and end, respectively. However, fluid channels can also be connected in parallel, which has the advantage of a higher temperature difference between the heating temperature of the PTC element and the temperature of the fluid and thus of more effective heat transfer and the disadvantage of a possibly lower final temperature of the fluid heated in the electric heating device.

The parallel extending fluid channels communicating with each other at the end face of the housing may be surrounded by a channel seal, which seals the adjacent fluid channels against the cover or the connection housing. This channel seal usually surrounds only two fluid channels that communicate directly with each other. These fluid channels can communicate through a trough that is recessed on the end face of the housing. This allows the cover or connection housing to fit tightly against the housing without dispensing with sufficient flow passage between the adjacent fluid channels.

A power transistor/IGBT may be provided opposite to said trough on the side of the connection housing, which abuts against the connection housing in a heat-conducting manner Thus, in the region of the trough, the fluid flow deflected there can cool the power transistor. If the connection housing is made of a metal, an insulation, for example in the form of a Kapton film, is located between the power transistor and the inner surface of the connection housing. The power transistor is typically connected directly to a printed circuit board, as illustrated in an embodiment of a control device within the meaning of the present invention.

A heating element seal may be provided between the housing and the connection housing, which encloses the heating element receptacle in a sealed manner Thus, the heating element receptacle may have a separate seal. It is understood that the heating element seal and the channel seal provided adjacent thereto may be identical in sections. A uniform sealing element may be located on the end face of the housing between the housing and the cover or the connection housing. Within an area surrounded by the heating element seal, the connection housing has at least one lead-through opening. At least one contact tongue passes through this lead-through opening and is electrically connected to one of the strip conductors of the associated PTC heating assembly. The corresponding contact tongues project into the connection housing and are electrically connected there. The connection may be made via a printed circuit board which can group various PTC heating assemblies into heating circuits and/or is additionally also equipped so that this printed circuit board can form a control device in the meaning of the present invention. However, the equipped printed circuit board can also be provided on a different level than the printed circuit board which electrically connects the contact tongues and is not equipped with electronic components.

Other sealing options are conceivable. For example, the housing can also be connected to the connection housing by material closure, in particular by welding, soldering or gluing.

According to a possible d further development of the present invention, the electric heating device is provided in a structural unit with a control device. This control device is usually integrated in the connection housing. The control device serves to control the at least one PTC heating assembly. The PTC elements provided in a single press-fit profile are usually assigned to a heating circuit. However, several PTC heating assemblies laid in parallel can be assigned to different heating ranges and switched via the control unit. In this configuration, the strip conductors project beyond the end of the housing and are extended into the connection housing. The strip conductors are electrically connected to the control unit. The connection housing is usually subdivided into a flow line area carrying the fluid and an electrical connection area for the strip conductors accommodating the control device. The connection area is usually located on a side of the flow line area facing away from the housing and is closed off with a cover. The strip conductors therefore project through the flow line area. The connection housing usually forms channels in which the strip conductors are guided separately from the fluid through the flow line area and into the connection area.

With regard to the desired pretension in the direction of the main side surfaces of the PTC element, the deformation projections are regularly provided at least, usually exclusively, between the main side surfaces of the PTC element and the opposite inner side of the heating element receptacle. With respect to uniform bilateral tensioning, corresponding deformation projections are provided between each main side surface of the PTC element and the opposite inner side of the heating element receptacle. The deformation projections are usually provided over the entire width of the PTC element or heating element receptacle and the press-fit profile. The width extends transversely to the longitudinal direction of extension of the housing as an extruded profile, i.e. transversely to the direction of pressing or extrusion in the manufacture of the extruded profile. The height extends in the plane of the width as the third Cartesian direction. The main side surface of the PTC element lies in a plane containing the width and longitudinal extension directions.

With respect to the most symmetrical heat extraction and uniform tolerance compensation, it is proposed, according to a possible further development of the present invention, to provide a plurality of deformation projections between one of the main side surfaces of the PTC element and the opposite inner side of the heating element receptacle.

With regard to good heat transfer between the press-fit profile and the inside of the heating element receptacle, it is proposed in accordance with a possible further development of the present invention that the deformation projections are configured as interlocking groove and spring elements, wherein a groove limiting projection limiting the groove and/or at least one spring projection at least partially forming the spring can be pivoted about an axis extending in the direction of insertion or longitudinal extension. The groove and spring elements according to this further development overlap each other considerably in the height direction and abut each other in the height direction. This creates a solid large-area heat transfer path between the housing and the press-fit profile. At least one groove limiting projection and/or at least one spring projection at least partially forming the spring may be wedge-shaped towards the free end. The wedge shape promotes the elastic pivoting movement of at least one of the deformation projections during joining. In this context, the present invention assumes that the heating element receptacle extends in the longitudinal direction of the housing and that the deformation projections, i.e. the groove and spring elements, extend in this direction. The joining movement is thus effected by inserting the press-fit profile in the longitudinal direction of the housing.

According to a possible still further development of the present invention, at least one compression element is provided between the press-fit profile part and a main side surface of the PTC element. The compression part is usually located within the press-fit profile part and provides additional pretensioning of the components within the PTC receptacle, if necessary also for equalizing a pretensioning force so that it is uniformly transmitted to an insulation and/or the PTC element. This prevents local overstressing of, for example, a ceramic insulating plate and/or the ceramic PTC element. The compression element can be formed by a spring made of metal. In this case, the spring usually extends over the entire surface of the main side surfaces in the width direction. The compression element may be provided between an inner surface of the PTC receptacle and an insulating layer which covers the PTC element on the outside.

According to a possible still further development of the present invention, a curing adhesive is introduced into the heating element receptacle. This can fill remaining free spaces between the deformation projections and thus improve heat-conducting properties. The adhesive can be a plastic adhesive with good thermal conductivity. For example, it can be a silicone adhesive with good heat-conducting particles, such as aluminum oxide particles, mixed in. In addition to the pretension due to the deformation projections, the adhesive also secures the position of the press-fit profile within the heating element receptacle.

BRIEF DESCRIPTION OF THE DRAWINGS

Further details, features and advantages of the present invention will be apparent from the following description of an embodiment in conjunction with the drawing. Therein:

FIG. 1A shows the flow path within the embodiment according to FIG. 1;

FIG. 5 is a front view of the housing;

FIG. 6 is a sectional view along line VI-VI as shown in FIG. 5, and

FIG. 7 is a sectional view along line VII-VII as shown in FIG. 5.

DETAILED DESCRIPTION

Figure 1:
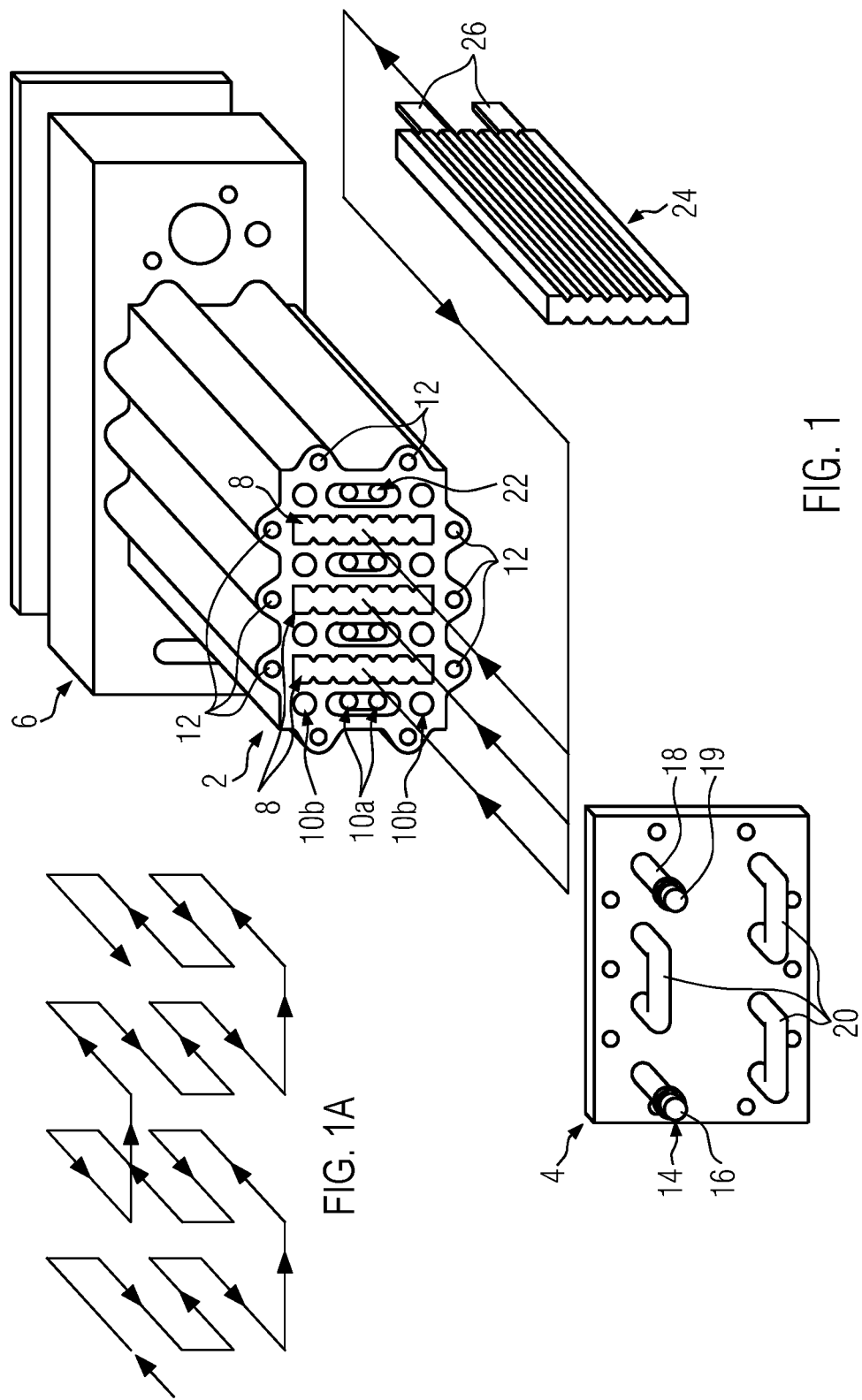
FIG. 1 is a perspective exploded view of an embodiment of the present invention.
Figure 2:
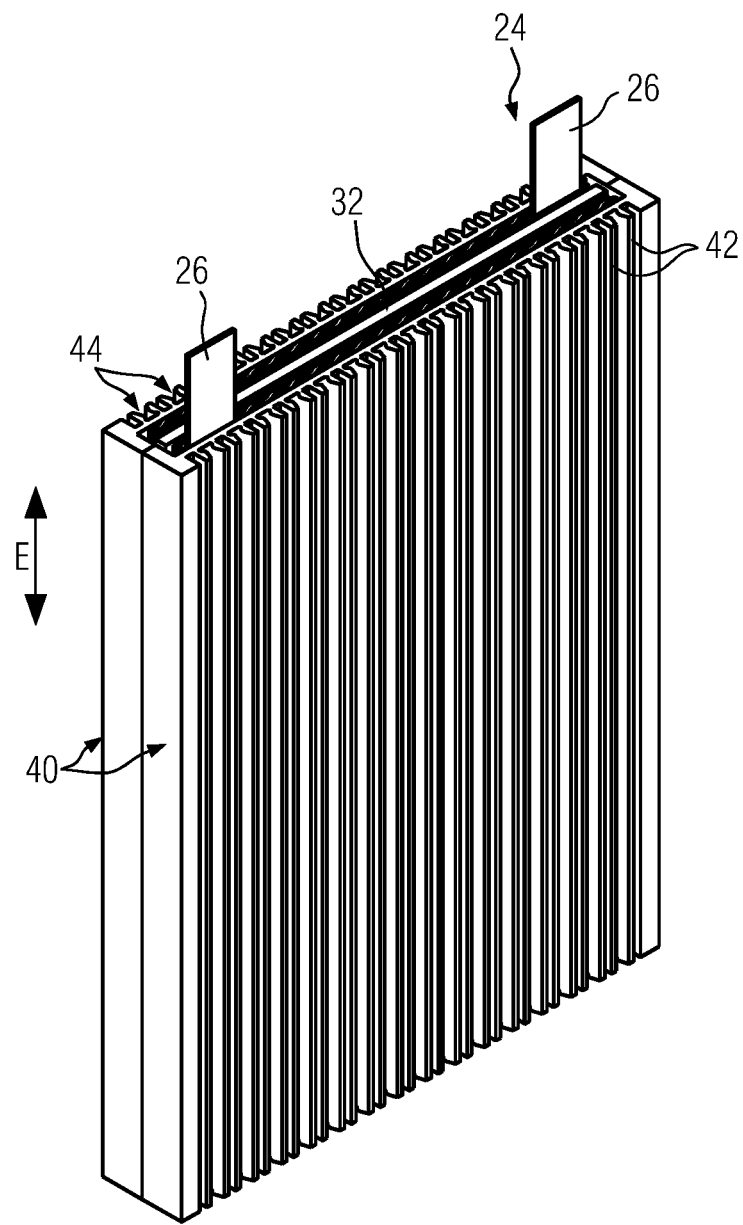
FIG. 2 is a perspective side view of a press-fit profile part of the embodiment according to FIG. 1.

FIG. 1 shows an electric heating device with a housing 2 provided between a cover 4 and a connection housing 6.

In the present case, the housing 2 has three heating element receptacles 8 of essentially rectangular cross-section provided parallel to one another and fluid channels 10 provided adjacent thereto. Four fluid channels are provided laterally to each of the individual heating element receptacles 8. The fluid channels 10a guide flow from the cover 4 in the direction of the connection housing 6. The fluid channels 10b guide the fluid in the opposite direction.

Distributed around the circumference, the housing 2 has a number of fastening channels 12 in which threaded rods or self-tapping screws not shown are provided, via which the cover 4 is connected to the connection housing 6 while sealingly enclosing the housing 2. Alternatively, self-tapping screws can also be used in the housing 2 itself to apply the cover 4 or the connection housing 6 in a sealed manner against the housing 2.

The solution according to the invention has the advantage that the respective heating element receptacles 8 are sealed against a uniform housing 2.

The upper and lower fluid channels 10 in FIG. 1 communicate with line sections of the cover 4, which are configured as inlet nozzles 14, outlet nozzles 18 and deflection nozzles 20, respectively. Via the deflection nozzles, a further conduction of the fluid conducted in the fluid channels 10 is effected beyond one of the heating element receptacles 8 and transversely thereto. An inlet opening 16 is formed at the free end of the inlet nozzle 14. An outlet opening 19 is formed at the free end of the outlet nozzle 18.

The circulation of the medium can be seen in the detail according to FIG. 1A. This also results in the conduction of the fluid on the side of the connection housing 6. The deflection on a plane of a heating element receptacle 8 usually takes place within the housing 2, so that the cover 4 or the connection housing 6 in this region merely abuts against the housing 2 as a flat plate sealed at the end face. For this purpose, the free ends of the fluid channels 10 end in a trough 22 recessed in the housing 2.

The housing 2 is manufactured as an extruded profile and cut to length. The press-fit profile characterized by reference sign 24 is formed with a corresponding length. A press-fit profile 24 is provided in each of the heating element receptacles 8.

As can be seen in FIG. 1, the press-fit profile is surmounted by contact tongues 26, which are integrally formed on contact plates that form strip conductors 28, which are accommodated in a PTC receptacle 30 and are in electrically conductive contact with PTC elements 32 of a PTC heating assembly 34. Details of this can be seen in particular in FIG. 3.

Reference sign 36 characterizes an insulating layer which covers the strip conductors 28 on the outside. A compression element 38 is located between this insulating layer 36, which is formed from a ceramic plate, and a main side surface of the PTC receptacle 30.

For inserting the aforementioned components into the PTC receptacle 30, the press-fit profile 24 is formed from two profile parts 40 that are joined together. The profile parts 40 are usually identically formed and accordingly may be cut from a single extruded profile. The profile parts 40 as well as the housing 2 may be formed of aluminum, for example.

Deformation projections in the form of groove limiting projections 42 project from opposite main side surfaces of the press-fit profile 24, respectively.

Figure 3:
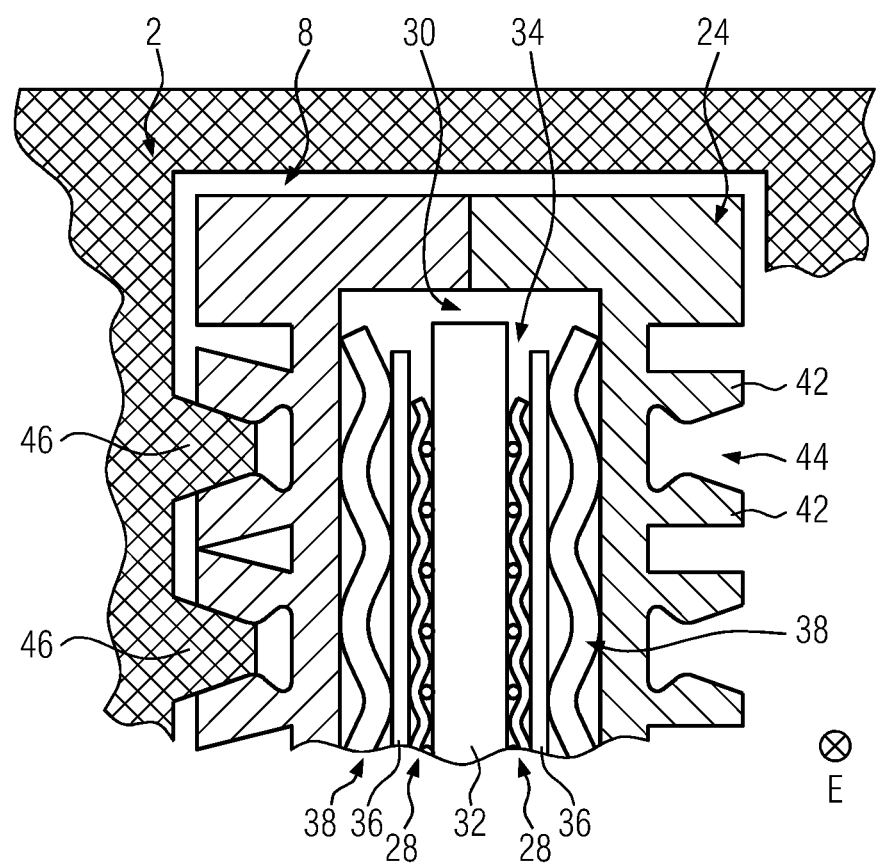
FIG. 3 is a cross-sectional view through the press-fit profile part according to FIG. 2 when mounted in the electric heating device according to FIG. 1.

As shown in particular in FIG. 3, a plurality of identically formed grooves 44 are recessed on the outside of the profile parts 40 between groove limiting projections 42 provided in pairs. The grooves 44 extend in the direction of insertion of the heating element receptacle 8, which is identified with E in FIG. 1 and corresponds to the direction of extrusion during manufacture of the extruded profile.

In turn, spring projections 46 project from the inside of the heating element receptacle 8. These spring projections 46 are integrally formed on the housing 2, which is configured as an extruded profile. As shown in the cross-sectional view according to FIG. 3, the spring projections 46 taper in a wedge shape towards their free end. In a corresponding manner, the groove limiting projections 42 are also wedge-shaped tapering towards their free end. It is understood that only the surfaces of the groove limiting projections 42 respectively limiting the groove 44 have such a configuration. In order to illustrate this, the spring projections 46 are omitted on the right-hand side in FIG. 3.

In the embodiment shown in FIG. 3, the press-fit profile 24 is first fitted with the PTC heating assembly 34 and the compression elements 38 during assembly. Then the preassembled assembly is inserted into the heating element receptacle 8. In this process, the spring projections 46 engage in the grooves 44 assigned to them. There is a deformation in the region of the groove limiting projections 42, which can be seen from the comparison of the right to the left side according to FIG. 3. This results in a certain tolerance compensation. In addition, the compression element 38 is deformed for tolerance compensation. Ideally, after assembly, the compression element 38 abuts essentially over the entire surface on the one hand against the inner surface of the PTC receptacle 30 and on the other hand against the outside of the insulating layer 36.

The compression element 38 may be made of aluminum, copper, copper beryllium, or other material having good thermal conductivity and applying permanently elastic pretensioning forces.

Remaining cavities in the heating element receptacle 8 can be filled by a good heat-conducting compound, for example a curing plastic compound filled with heat-conducting particles.

Figure 4:
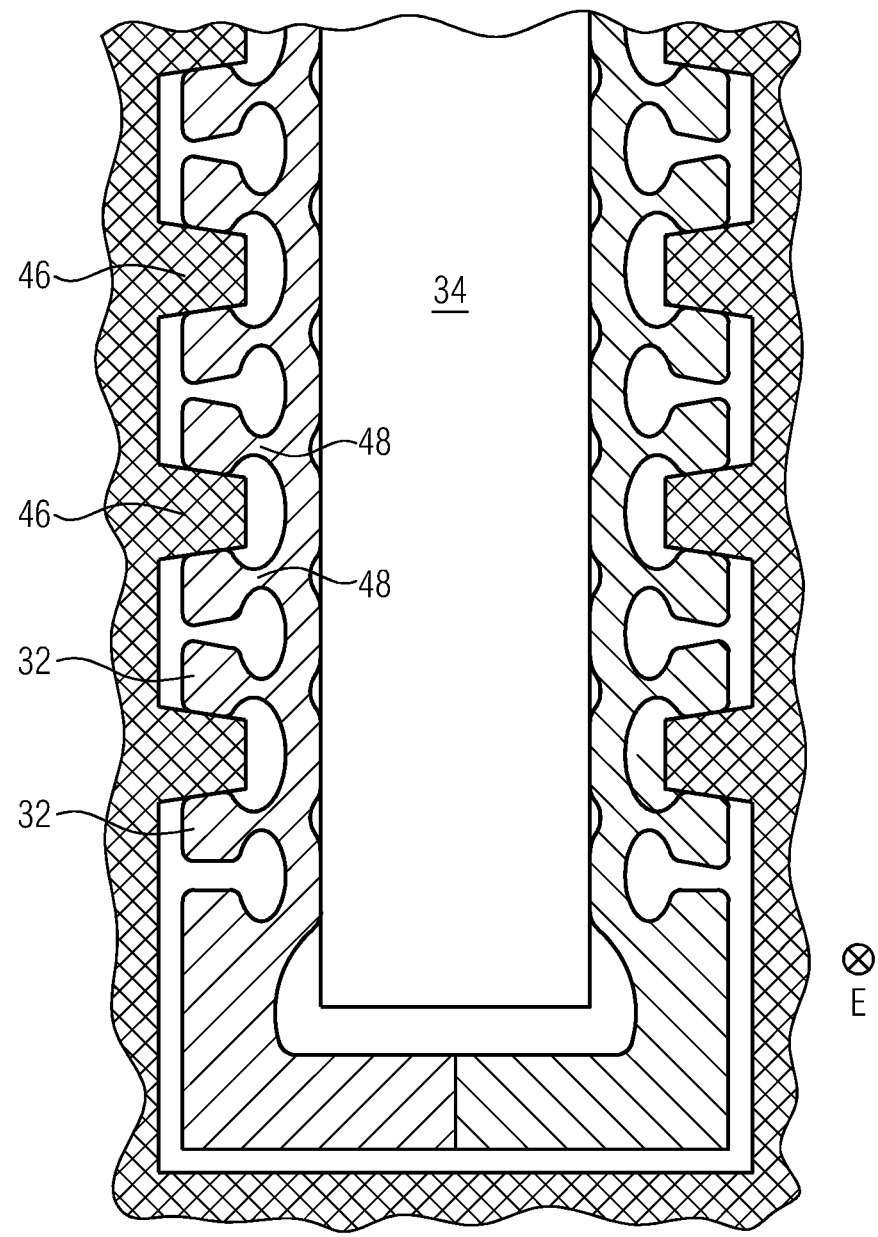
FIG. 4 is a sectional view according to FIG. 3 for a variant of the press-fit profile part.

In the variant shown in FIG. 4, the groove limiting projections 42 are connected to the remaining profile part 40 via a relatively thin web 48. This web 48 creates a pivot axis that extends essentially in the insertion direction E. In this embodiment, compression elements can be dispensed with. Adjacent groove limiting projections 42 to different grooves 44 are spaced sufficiently far apart so that when the wedge-shaped spring projections 46 are inserted, they can each pivot about their pivot axis without abutting against each other. This allows considerable tolerance compensation. The layers of the PTC heating assembly 34 within the press-fit profile 24 are thereby applied with good elastic tension against the inner surface of the PTC receptacle 30, which improves heat extraction.

FIG. 4 also illustrates the bulging of the inner surfaces of the PTC receptacle 30 such that it forms a contact surface which, in the cross-sectional view, is essentially punctiform and, in the longitudinal direction, is in linear contact with the insulating layer 36. This deformation of the press-fit profile 24 causes an additional elastic pretension also of the PTC element 32 in the PTC receptacle 30.

As the specific description illustrates, the deformation projections present in the form of the groove limiting projections 42 and the spring projections 46 result in an elastic pretension between the housing 2 and the press-fit profile 24. As a result, the PTC element is applied to the layers of the PTC heating assembly 34 with good heat-conducting properties. Good electrical contact is also effected between the strip conductor 28 and the PTC element 32.

As FIG. 1 shows, the contact tongues 26 project beyond the press-fit profile 24 at the end. These contact tongues 26 are electrically contacted in the connection housing 6.

The end-face view of the housing 2 according to FIG. 5 illustrates a sealing element 50. This sealing element 50 forms a channel seal 50a enclosing two adjacent fluid channels 10a on the end face as well as a heating element seal 50b enclosing a heating element receptacle 8. The channel seal 50a and the heating element seal 50b share wall sections that extend in the height direction between the individual sections in FIG. 5. The sealing element 50 abuts against the flat end face of the housing 2. On the opposite side, either the cover 4 or the connection housing 6 is in contact. In FIG. 5, the sealing element 50 is shown in relation to the connection housing 6.

The sectional view according to FIG. 6 illustrates the heat-conducting contact of a power transistor 52, which is shown as part of a control device 54, which also comprises a printed circuit board 56. This power transistor 52 is in heat-conducting contact with a wall section of the connection housing 6, which in the present case is formed from aluminum. A Kapton film is provided therebetween as electrical insulation between the connection housing 6 and the power transistor 52.

Reference sign 60 identifies self-tapping screws which pass through the connection housing 6 and are screwed into the respective fastening channel 12. These screws 60 clamp the sealing element 50 between the end face of the housing 2 and the connection housing 6.

In FIG. 7, recessed lead-through openings 62 are shown in the connection housing 6, through which contact tongues 26 protrude, which are in electrical contact with the printed circuit board 56 and protrude therethrough.

The invention claimed is:

1. An electric heating device comprising:
a housing which forms a heating element receptacle and at least one fluid channel; and
a PTC heating assembly that has a press-fit profile and that is inserted into the heating element receptacle, the PTC heating assembly including at least one PTC element and strip conductors abutting on the PTC heating element in an electrically conductive manner, wherein the housing is formed from an extruded profile, wherein deformation projections are formed between the housing and the press-fit profile and are formed by the housing and/or the press-fit profile, wherein the projections hold the press-fit profile under a pretension in the heating element receptacle;
wherein the housing forms 1) a plurality of fluid channels extending parallel to each other, and 2) at least one heating element receptacle extending between at least two fluid channels and extending parallel with the fluid channels; and
wherein the housing includes a cover provided at a first end thereof, and wherein the housing is configured such that a flow of fluid to be heated is deflected through the cover from one of the fluid channels into another of the fluid channels.

2. The electric heating device according to claim 1, wherein the at least one heating element receptacle extends parallel with the fluid channels.

3. The electric heating device according to claim 1, wherein the housing is provided on a second end thereof opposite the first end with a connection housing which connects one of the fluid channels to an inlet opening for the fluid to be heated and the other of the fluid channels to an outlet opening for the fluid to be heated.

4. The electric heating device according to claim 3, wherein adjacent fluid channels are connected in series and are surrounded at one of the ends of the housing by a channel seal which seals off fluid channels from the cover or the connection housing.

5. The electric heating device according to claim 4, wherein the adjacent fluid channels communicate with each other through a trough recessed on one of the ends of the housing.

6. The electric heating device according to claim 3, wherein a heating element seal is provided between the housing and the connection housing and seals the heating element receptacle.

7. The electric heating device according to claim 6, wherein the connection housing forms a lead-through opening surrounded by the heating element seal, and through which contact tongues that are electrically connected to the strip conductors project into the connection housing.

8. The electric heating device according to claim 3, wherein the connection housing surrounds a control device for controlling the at least one PTC heating assembly, and wherein the strip conductors project beyond the end of the housing, are extended into the connection housing, and are electrically connected to the control device.

9. The electric heating device according to claim 1, wherein deformation projections are provided between each of two main side surfaces of the PTC element and an opposite inner side of the PTC receptacle.

10. The electric heating device according to claim 1, wherein a plurality of deformation projections are provided between one of the main side surfaces of the PTC element and the opposite inner surface of the heating element receptacle.

11. The electric heating device according to claim 9, wherein the deformation projections are configured as interlocking groove and spring elements, and wherein at least one groove limiting projection limiting the groove and/or at least one spring projection at least partially forming the spring can be pivoted about an axis extending in an insertion direction of the PTC heating assembly into the heating element receptacle.

12. The electric heating device according to claim 10, wherein the deformation projections are configured as interlocking groove and spring elements, wherein at least one groove limiting projection limiting the groove and/or at least one spring projection at least partially forming the spring can be pivoted about an axis extending in an insertion direction of the PTC heating assembly into the heating element receptacle.

13. The electric heating device according to claim 11, wherein at least one groove limiting projection limiting the groove and/or at least one spring projection at least partially forming the spring is configured to be wedge-shaped so as to taper toward a free end thereof.

14. The electric heating device according to claim 1, wherein the PTC heating assembly further comprises an insulation that supports the strip conductors against the PTC receptacle in an insulated manner.

15. The electric heating device according to claim 1, wherein the cover further comprises deflection nozzles that are configured to deflect the flow of fluid to be heated through the cover from one of the fluid channels into another of the fluid channels.

16. The electric heating device according to claim 5, wherein a power transistor is disposed within the connection housing opposite the trough.

* * * * *